(12) United States Patent
Debski

(10) Patent No.: US 8,925,828 B1
(45) Date of Patent: Jan. 6, 2015

(54) PORTABLE RETAIL TRANSACTION AIDING DEVICE

(71) Applicant: Stefan Jerzy Debski, Winchester, VA (US)

(72) Inventor: Stefan Jerzy Debski, Winchester, VA (US)

(*) Notice: Subject to any disclaimer, the term of this patent is extended or adjusted under 35 U.S.C. 154(b) by 198 days.

(21) Appl. No.: 13/660,550

(22) Filed: Oct. 25, 2012

Related U.S. Application Data

(63) Continuation-in-part of application No. 12/946,861, filed on Nov. 16, 2010, now abandoned.

(51) Int. Cl.
*G06K 19/06* (2006.01)

(52) U.S. Cl.
USPC .......................................... 235/492; 235/375

(58) Field of Classification Search
CPC ... G06Q 30/02; G06Q 20/32; G06Q 30/0222; G06Q 30/06; G06Q 20/00; G06Q 20/108; G06Q 20/325; G06Q 30/0238; G06Q 20/04; G06Q 20/352; G06Q 30/0267; G07F 7/1008; G07F 7/02; G07F 7/0893; H04N 21/812; H04W 4/008; H04W 4/206; H04W 12/00; H04W 8/005; H04L 67/306; H04L 63/10; H04L 67/04; G06F 21/60; G06K 7/0004; G06K 7/10881; H04B 1/3816
USPC .................. 235/492, 375, 380, 383, 486, 487
See application file for complete search history.

(56) References Cited

U.S. PATENT DOCUMENTS

| | | | |
|---|---|---|---|
| 4,634,845 A | 1/1987 | Hale | |
| 5,748,737 A | 5/1998 | Daggar | |
| 5,773,804 A | 6/1998 | Baik | |
| 6,331,972 B1 | 12/2001 | Harris | |
| 7,058,895 B2 | 6/2006 | Kautto-Koivula | |
| 7,089,310 B1 | 8/2006 | Ellerman | |
| 7,712,658 B2 | 5/2010 | Gangi | |
| 2006/0026070 A1* | 2/2006 | Sun | 705/14 |
| 2009/0321522 A1* | 12/2009 | Lohr et al. | 235/462.13 |
| 2011/0212717 A1 | 9/2011 | Rhoads | |
| 2011/0302019 A1* | 12/2011 | Proctor et al. | 705/14.27 |
| 2012/0072350 A1* | 3/2012 | Goldthwaite et al. | 705/44 |
| 2012/0084132 A1* | 4/2012 | Khan | 705/14.26 |

* cited by examiner

*Primary Examiner* — Thien M Le
(74) *Attorney, Agent, or Firm* — Neustel Law Offices

(57) ABSTRACT

A portable retail transaction aiding device for electronically storing retail transaction records, providing identification at a retailer and storing coupons for use at a retailer. The portable retail transaction aiding device generally includes a portable, handheld housing which contains various internal components, such as a data transfer connector, wireless transceiver, central processing circuitry and memory. The data transfer connector may be utilized to store various information on the memory of the device, such as electronic coupons and merchant membership identifications. The wireless transceiver may be utilized in combination with a merchant's computing device to process and store transaction information such as amount paid, products purchased and the like to eliminate the need for paper records in purchasing and/or returning items.

20 Claims, 3 Drawing Sheets

PORTABLE RETAIL TRANSACTION AIDING DEVICE

CROSS REFERENCE TO RELATED APPLICATIONS

I hereby claim benefit under Title 35, United States Code, Section 120 of U.S. patent application Ser. No. 12/946,861 filed Nov. 16, 2010. This application is a continuation-in-part of the Ser. No. 12/946,861 application. The Ser. No. 12/946,861 application is currently pending. The Ser. No. 12/946,861 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a retail transaction aid and more specifically it relates to a portable retail transaction aiding device for electronically storing retail transaction records, providing identification at a retailer and storing coupons for use at a retailer.

2. Description of the Related Art

Any discussion of the related art throughout the specification should in no way be considered as an admission that such related art is widely known or forms part of common general knowledge in the field.

Consumers in recent years have been relying on paper records less often for recording transaction records and the like. Electronic record-keeping has increased substantially in popularity due to advances in technology. However, when shopping at a retailer, consumers are often only provided paper receipts for their transactions. Further, paper coupons are often required which are exceedingly difficult to deal with in light of the recent aversion to paper-based records and the like.

Because of the inherent problems with the related art, there is a need for a new and improved portable retail transaction aiding device for electronically storing retail transaction records, providing identification at a retailer and storing coupons for use at a retailer.

BRIEF SUMMARY OF THE INVENTION

The invention generally relates to a retail transaction aiding device which includes a portable, handheld housing which contains various internal components, such as a data transfer connector, wireless transceiver, central processing circuitry and memory. The data transfer connector may be utilized to store various information on the memory of the device, such as electronic coupons and merchant membership identifications. The wireless transceiver may be utilized in combination with a merchant's computing device to process and store transaction information such as amount paid, products purchased and the like to eliminate the need for paper records in purchasing and/or returning items.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
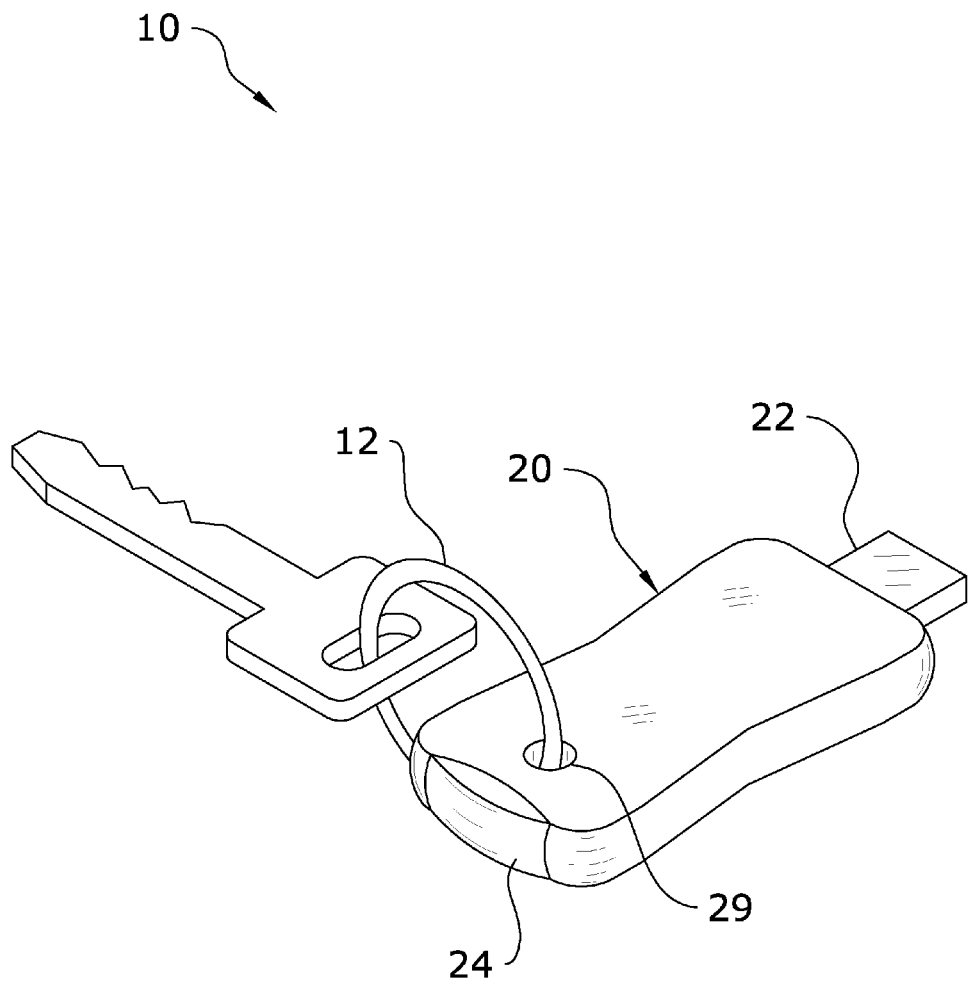
FIG. 1 is an upper perspective view of the present invention.
Figure 2:
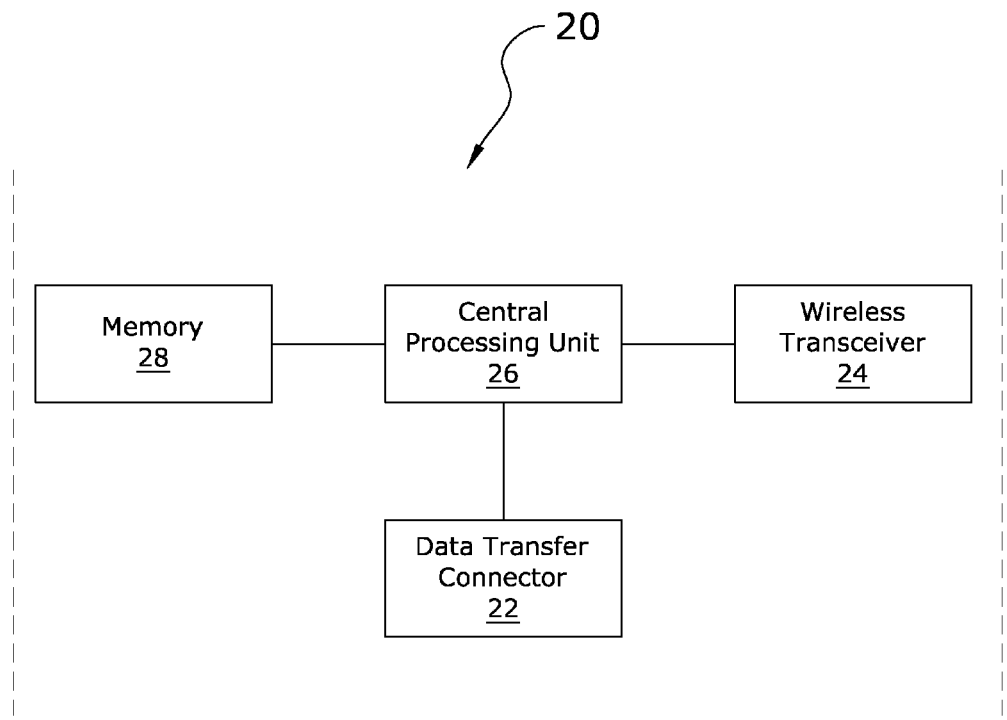
FIG. 2 is a block diagram illustrating the internal components of the present invention.

Turning now descriptively to the drawings, in which similar reference characters denote similar elements throughout the several views, FIGS. 1 through 2 illustrate a portable retail transaction aiding device 10, which comprises a portable, handheld housing 20 which contains various internal components, such as a data transfer connector 22, wireless transceiver 24, central processing circuitry 26 and memory 28. The data transfer connector 22 may be utilized to store various information on the memory 28 of the device 10, such as electronic coupons and merchant membership identifications. The wireless transceiver 24 may be utilized in combination with a merchant's computing device to process and store transaction information such as amount paid, products purchased and the like to eliminate the need for paper records in purchasing and/or returning items.

B. Housing

As shown in FIG. 1, the present invention is generally comprised of a portable, handheld housing 20 which stores the internal components which perform the various functions of the present invention. The housing 20 may be comprised of various shapes, sizes and configurations. Thus, the housing 20 should not be construed as being limited to the exemplary configuration shown in the figures. It is preferable that the housing 20 be portable, handheld and small enough in size to easily fit within a user's pocket.

Figure 3:
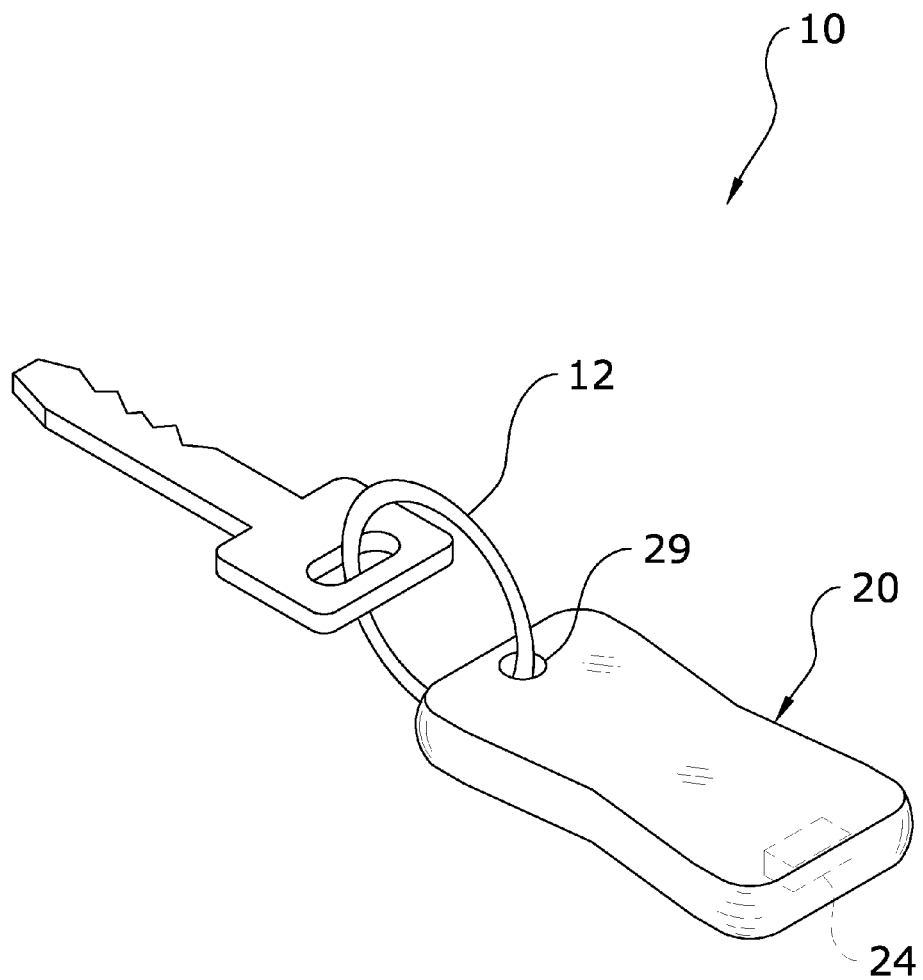
FIG. 3 is an upper perspective view of an alternate embodiment of the present invention.

The housing 20 will generally include a data transfer connector 22 extending therefrom for connection with a corresponding data port, such as a universal serial bus (USB) port or the like for communicating with a user's personal computing device such as a personal computer. Various types of data transfer connectors 22 may be utilized. While the data transfer connector 22 is shown to effectuate a wired transfer in the figures, it is appreciated that, in some embodiments, a wireless connector 22 may be utilized as shown in FIG. 3.

The housing 20 will also generally include a wireless transceiver 24 for communicating with a retailer's computing device, such as a cash register or an attachment thereof. Various types of wireless transceivers 24 may be utilized, such as RFID, infrared, Bluetooth®, Wi-Fi and the like, so long as the present invention is capable of wirelessly sending and receiving data with the retailer's computing device. It is noted that, in some embodiments, the data transfer connector 22 and wireless transceiver 24 could be provided in a single transceiver 24 which performs communications functionality with both the retailer's and the consumer's computing device.

In some embodiments, the housing 20 may include an aperture 29 extending through its body as shown in FIG. 1. The aperture 29 may be utilized to secure the present invention to a keychain for ease of transport.

C. Internal Components

FIG. 2 is a block diagram illustrating the internal components of the present invention which provide its functionality. The housing 20 will generally contain an integrated circuit board which acts to direct the functionality of the present invention. In some embodiments, a central processing unit 26 may be utilized, though it is appreciated that the functionality of such a central processing unit 26 may be integrated directly into the circuit board due to the simplified nature of the processes of the present invention.

The data transfer connector 22 and wireless transceiver 24 are both communicatively interconnected with the central processing unit 26 so as to receive and perform instructions therefrom. The present invention also preferably includes internal member 28 for storing data such as transaction receipts, coupons and the like for transfer to either a retailer's computing device or the consumer's computing device as described in the following section. Various types of internal memory 28 may be utilized, such as flash memory and the like so long as the data is retained thereon for an appreciable amount of time for later use by the consumer.

D. Operation of Preferred Embodiment

The present invention performs a number of functions which aid in completing transactions, recording transactions, identifying a consumer and storing/applying coupons. By storing receipts and coupons electronically, businesses will be able to utilize less paper which normally would be used for printing paper receipts. Further, the storage of all receipts from multiple retailers by the consumer eases returns of products and reduces fraudulent receipts and returns. By electronically storing coupons, the application of a coupon to a retail transaction can be simplified both for the consumer and the merchant.

Upon first obtaining the present invention, a consumer may connect the present invention with his/her personal computing device (such as a personal computer, laptop and the like) to transfer membership information to be stored on the memory 28 of the device 10. In a first embodiment, the consumer will directly connect the present invention with his/her computing device through use of the data transfer connector 22, such as plugging into a USB port. In an alternate embodiment, the consumer may wirelessly transfer information to the present invention from his/her computing device via the wireless transceiver 24. The membership data will be stored on the memory 28 for future use.

When the consumer purchases items at a retailer, the present invention transfer membership information from the memory 28 to the retailer's computing device (such as a cash register) via the wireless transceiver 24. Thus, the benefits of a loyalty card or similar program may be obtained easily upon first arriving at the register. If no membership information is stored on the device 10 and thus the merchant is not recognized, a unique identification number specific to that merchant will be stored in the memory 28 of the present invention to be associated with any purchases there. The consumer may also store other items such as electronic coupons within the memory 28 of the present invention.

After this initial step is performed, items may be scanned by the retailer. Each scanned item is stored within the memory 28 of the present invention. The central processing unit 26 of the present invention will compare each product with any electronic coupons stored within its memory 28. Upon detection of an applicable coupon, the wireless transceiver 24 will communicate data relating to the coupon to the retailer's computing device so that it may be applied to the transaction.

After completing of scanning of items, the consumer will pay for the transaction. The present invention will store data such as the form of payment, the items purchased as well as any coupons granted by the merchant for future usage in the memory 28. Communications between the present invention and the merchant's computing device will then terminate.

Should a consumer wish to return an item, the consumer would first establish connectivity with the retailer via the wireless transceiver 24. The present invention will transfer membership information, if stored. After the item to be returned is scanned in by the merchant, the present invention will transfer proof of purchase, purchase date, purchase price and form of payment to the merchant computer. The merchant, upon verifying this information, may grant a refund. The refund is stored within the memory 28 of the present invention, including data such as the date of return, item returned, return amount and return form of payment.

After competing transactions, the consumer may connect the present invention directly to his/her computer either wirelessly or through the data connector 22. Thus, the consumer may view on his/her computer all transaction receipts and coupons sorted by merchant. The consumer may also transfer any data from the memory 28 of the present invention to be stored more permanently on his/her computing device.

Further, data received from the present invention may be processed to provide transaction analysis, such as total expenditures by merchant. Previous receipts may be processed to ease processing of additional purchases of the same products from the same merchant at a future date.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of aiding with retail transactions, comprising:
providing a portable, handheld device, wherein said device includes a wireless transceiver and memory, said device comprising a key fob configuration;
connecting said device to a personal computer via said wireless transceiver;
storing electronic coupons from said personal computer within said memory of said device;
connecting said device to a merchant computer via said wireless transceiver;
receiving transaction information from said merchant computer via said wireless transceiver; and
storing said transaction information within said memory.

2. The method of aiding with retail transactions of claim 1, wherein said wireless transceiver is comprised of an RFID transceiver.

3. The method of aiding with retail transactions of claim 1, wherein said wireless transceiver is comprised of a Wi-Fi transceiver.

4. The method of aiding with retail transactions of claim 1, wherein said wireless transceiver is comprised of an infrared transceiver.

5. The method of aiding with retail transactions of claim 1, wherein said transaction information is comprised of items purchased.

6. The method of aiding with retail transactions of claim 5, wherein said transaction information is further comprised of purchase date and form of payment.

7. The method of aiding with retail transactions of claim 1, wherein said device includes an aperture extending therethrough.

8. The method of aiding with retail transactions of claim 1, wherein said memory is comprised of flash memory.

9. The method of aiding with retail transactions of claim 1, further comprising the step of storing membership information for a merchant within said memory of said device.

10. The method of aiding with retail transactions of claim 9, further comprising the step of transferring said membership information to said merchant computer.

11. A method of aiding with retail transactions, comprising:
providing a portable, handheld device, wherein said device includes a wireless transceiver, a data transfer connector and memory, said device comprising a key fob configuration;
connecting said device to a personal computer via said data transfer connector;
storing electronic coupons from said personal computer within said memory of said device;
connecting said device to a merchant computer via said wireless transceiver;
receiving transaction information from said merchant computer via said wireless transceiver; and
storing said transaction information within said memory.

12. The method of aiding with retail transactions of claim 11, wherein said data transfer connector is comprised of a universal serial bus connector.

13. The method of aiding with retail transactions of claim 11, wherein said wireless transceiver is comprised of a Wi-Fi transceiver.

14. The method of aiding with retail transactions of claim 11, wherein said wireless transceiver is comprised of an infrared transceiver.

15. The method of aiding with retail transactions of claim 11, wherein said transaction information is comprised of items purchased.

16. The method of aiding with retail transactions of claim 15, wherein said transaction information is further comprised of purchase date and form of payment.

17. The method of aiding with retail transactions of claim 11, further comprising an aperture extending through said device.

18. The method of aiding with retail transactions of claim 11, wherein said memory is comprised of flash memory.

19. The method of aiding with retail transactions of claim 11, further comprising the step of storing membership information for a merchant within said memory of said device.

20. The method of aiding with retail transactions of claim 19, further comprising the step of transferring said membership information to said merchant computer.

* * * * *